United States Patent
Han

(10) Patent No.: US 12,085,156 B2
(45) Date of Patent: Sep. 10, 2024

(54) GEARBOX FOR ELECTRIC VEHICLES

(71) Applicant: HYUNDAI MOBIS CO., LTD., Seoul (KR)

(72) Inventor: Kyung Won Han, Uiwang-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/380,807

(22) Filed: Oct. 17, 2023

(65) Prior Publication Data

US 2024/0167548 A1 May 23, 2024

(30) Foreign Application Priority Data

Nov. 23, 2022 (KR) .................. 10-2022-0157913

(51) Int. Cl.
*F16H 37/08* (2006.01)

(52) U.S. Cl.
CPC ...... *F16H 37/082* (2013.01); *F16H 2200/0021* (2013.01); *F16H 2200/0034* (2013.01); *F16H 2200/0039* (2013.01); *F16H 2200/201* (2013.01); *F16H 2200/2012* (2013.01); *F16H 2200/2035* (2013.01); *F16H 2200/2038* (2013.01)

(58) Field of Classification Search
CPC .......... F16H 37/082; F16H 2200/0021; F16H 2200/0034; F16H 2200/0039; F16H 2200/201; F16H 2200/2012; F16H 2200/2035; F16H 2200/2038; F16H 48/10; F16H 37/043; F16H 2200/2097; F16H 3/663; B60K 2007/0092; B60K 17/16; B60K 17/08
See application file for complete search history.

(56) References Cited

U.S. PATENT DOCUMENTS

| | | | |
|---|---|---|---|
| 2009/0156352 A1* | 6/2009 | Seo .......... | F16H 3/666 475/276 |
| 2015/0211608 A1* | 7/2015 | Himmelsbach ....... | F16H 37/042 475/269 |
| 2020/0116244 A1* | 4/2020 | Mittelberger ............ | B60K 1/00 |
| 2020/0149612 A1* | 5/2020 | Rippelmeyer .......... | F16H 3/666 |
| 2020/0171941 A1* | 6/2020 | Lutz .......... | F16H 3/62 |
| 2020/0318713 A1* | 10/2020 | Beck ...... | B60K 6/445 |
| 2021/0222760 A1* | 7/2021 | Engerman ............. | F16H 3/66 |
| 2022/0170533 A1* | 6/2022 | Luo .......... | B62M 11/18 |

* cited by examiner

*Primary Examiner* — Jacob S. Scott
*Assistant Examiner* — Farhana Pervin
(74) *Attorney, Agent, or Firm* — Morgan, Lewis & Bockius LLP

(57) ABSTRACT

Provided is a gearbox for an electric vehicle. The gearbox for an electric vehicle includes a plenary gear revolving around a sun gear and adopts a differential planetary gear method of reducing a rotational speed by using a difference between the numbers of teeth of the planetary gear and the sun gear.

13 Claims, 3 Drawing Sheets

GEARBOX FOR ELECTRIC VEHICLES

CROSS-REFERENCE TO RELATED APPLICATIONS

This application claims priority under 35 U.S.C. § 119 to Korean Patent Application No. 10-2022-0157913, filed on Nov. 23, 2022, in the Korean Intellectual Property Office, the disclosure of which is incorporated herein by reference in its entirety.

TECHNICAL FIELD

The following disclosure relates to a gearbox for an electric vehicle, and in particular, to a gearbox for an electric vehicle including a planetary gear revolving around a sun gear and adopting a differential planetary gear method of reducing a rotational speed by using a difference between the numbers of teeth of the planetary gear and the sun gear.

BACKGROUND

Recently, as global oil prices have risen and exhaust gas emission regulations have been gradually strengthened, car makers have concentrated their efforts on the development of future vehicle technology that may improve fuel efficiency in an eco-friendly manner, and future vehicles include electric vehicles and hybrid electric vehicles using electric energy.

Among them, electric vehicles use an electric motor that generates power by receiving power from a battery as a power source, and have come to prominence as an eco-friendly vehicle with no emission of carbon dioxide and high energy efficiency.

FIG. 1 is a diagram illustrating an example of a gearbox for an electric vehicle of the related art.

An electric vehicle includes a speed reducer that reduces and outputs rotation of a rotational shaft of a motor at a constant rate, and as shown in FIG. 1, power output from a motor 5000 is reduced by a secondary reducing unit 2000 to output rotational force in a state in which a primary reducing unit 1000 is engaged with a shift clutch 4000 and a two-speed gear train 3000 does not operate.

In addition, in a state in which the primary reducing unit 1000 is not engaged with the shift clutch 4000, power output from the motor 5000 may be increased by the two-speed gear train 3000 and then reduced by the secondary reducing unit 2000 to output a rotational force.

However, such a gearbox for an electric vehicle of the related art has a problem in that manufacturing costs increase and a failure probability increases as the number of parts included therein increases, and since the primary reducing unit 1000 and the secondary reducing unit 2000 are formed of a single gear engagement structure, the primary reducing unit 1000 and the secondary reducing unit 2000 may be damaged unless they are manufactured to have high strength.

Therefore, it is necessary to develop a gearbox for an electric vehicle that may include a small number of parts to reduce manufacturing costs and reduce the failure probability and that may include a main power transmission device formed to have a multi-gear engagement structure and thus may not be easily damaged.

SUMMARY

An exemplary embodiment of the present invention is directed to providing a gearbox for an electric vehicle including a small number of parts, thereby reducing manufacturing costs and being manufactured to be light in weight.

Another exemplary embodiment of the present invention is directed to providing a gearbox for an electric vehicle in which a main power transmission device is formed as a multi-gear engagement structure by including a planetary gear reduction structure, which, thus, is not easily damaged.

Another exemplary embodiment of the present invention is directed to providing a gearbox for an electric vehicle capable of driving an electric vehicle in a driving range with good motor efficiency.

The object of the present invention is not limited to the tasks mentioned above, and other tasks not mentioned will be clearly understood by those skilled in the art from the description below.

In one general aspect, a gearbox for an electric vehicle includes: a power source generating rotational force; an input shaft having one side connected to the power source and receiving the rotational force from the power source; a planetary gear set including a first planetary gear, a second planetary gear, and a third planetary gear converting torque of the rotational force applied from the input shaft and outputting the converted torque; a rotating shaft on which the first planetary gear, the second planetary gear, and the third planetary gear are rotatably installed; a first sun gear having one side connected to the first planetary gear to receive the rotational force from the first planetary gear and the other side fixed; a second sun gear having one side connected to the second planetary gear to receive the rotational force from the second planetary gear; a third sun gear having one side connected to the third planetary gear to receive rotational force from the third planetary gear; an output shaft outputting rotational force; a first clutch connected to the other side of the second sun gear and selectively connecting the second sun gear to the output shaft; and a second clutch connected to the other side of the third sun gear and selectively connecting the third sun gear to the output shaft, wherein, when the first clutch connects the second sun gear to the output shaft and the second clutch releases the connection between the third sun gear and the output shaft, rotational force applied from the input shaft through the second planetary gear is transferred to the output shaft, and when the second clutch connects the third sun gear to the output shaft and the first clutch releases the connection between the second sun gear and the output shaft, rotational force applied from the input shaft through the third planetary gear is transferred to the output shaft.

The first clutch and the second clutch may be connected to a differential gear, and the differential gear is connected to the output shaft.

The power source may be a motor.

In another general aspect, a gearbox for an electric vehicle includes: a power source generating rotational force; an input shaft having one side connected to the power source and receiving the rotational force from the power source; a planetary gear set including a first planetary gear, a second planetary gear, a third planetary gear, and a fourth planetary converting torque of the rotational force applied from the input shaft and outputting the converted torque; a rotating shaft on which the first planetary gear, the second planetary gear, the third planetary gear, and the fourth planetary gear are rotatably installed; a first sun gear having one side connected to the first planetary gear to receive the rotational force from the first planetary gear and the other side fixed; a second sun gear having one side connected to the second planetary gear to receive the rotational force from the second planetary gear; a third sun gear having one side connected to the third planetary gear to receive the rotational force from the third planetary gear; a fourth sun gear having one side connected to the fourth planetary gear to receive the rotational force from the fourth planetary gear; an output shaft outputting the rotational force; a first clutch connected to the other side of the second sun gear and selectively connecting the second sun gear to the output shaft; a second clutch connected to the other side of the third sun gear and selectively connecting the third sun gear to the output shaft; and a third clutch connected to the other side of the fourth sun gear and selectively connecting the fourth sun gear to the output shaft, wherein, when the first clutch connects the second sun gear to the output shaft, the second clutch releases the connection between the third sun gear and the output shaft, and the third clutch releases the connection between the fourth sun gear and the output shaft, the rotational force applied from the input shaft through the second planetary gear is transferred to the output shaft, when the second clutch connects the third sun gear to the output shaft, the first clutch releases the connection between the second sun gear and the output shaft, and the third clutch releases the connection between the fourth sun gear and the output shaft, the rotational force applied from the input shaft through the third planetary gear is transferred to the output shaft, and when the third clutch connects the fourth sun gear to the output shaft, the first clutch releases the connection between the second sun gear and the output shaft, and the second clutch releases the connection between the third sun gear and the output shaft, the rotational force applied from the input shaft through the fourth planetary gear is transferred to the output shaft.

The first clutch, the second clutch, and the third clutch may be connected to a differential gear, and the differential gear is connected to the output shaft.

The power source may be a motor.

Other features and aspects will be apparent from the following detailed description, the drawings, and the claims.

DETAILED DESCRIPTION OF EXEMPLARY EMBODIMENTS

Figure 1:
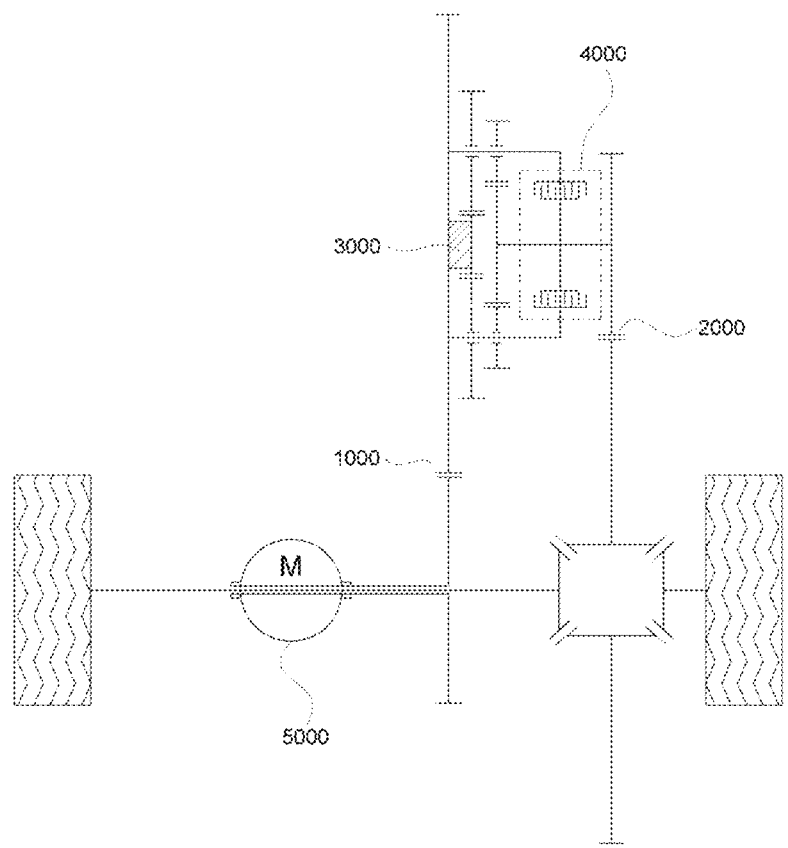
FIG. 1 is a diagram illustrating an example of a gearbox for an electric vehicle of the related art.

Hereinafter, exemplary embodiments of the present invention are described in detail with reference to the accompanying drawings such that those skilled in the art may easily put the invention into practice. The invention may be embodied in various forms and is not limited to the exemplary embodiments which are described below. For the purpose of clear description of the invention, parts which are not described are omitted and like parts in the specification are referenced by like reference numerals.

In the entire specification, when it is mentioned that an element is "connected" to another element, this mention includes a case in which both elements are "directly connected to each other" and a case in which both elements are "indirectly connected to each other" with still another element interposed therebetween.

In the entire specification, when it is mentioned that an element is located "on" another element, this mention includes a case in which an element comes in contact with another element and a case in which still another element is present between both elements.

In the entire specification, when it is mentioned that an element "includes" another element, this means that the element may further include still another element without excluding still another element unless oppositely described. Terms, "about," "substantially," and the like indicating degrees, which are used in the entire specification when manufacturing errors and material-allowable errors specific to the mentioned meaning are given, are used to prevent an unconscientious infringer from improperly using the disclosed details. Terms, such as an "operation of doing" or "operation of" indicating degrees, which are used in the entire specification do not mean an "operation for."

Hereinafter, exemplary embodiments of the present invention are described in detail with reference to the accompanying drawings and the description below. However, the present invention is not limited to the exemplary embodiments described herein and may be embodied in other forms. Like reference numbers indicate like elements throughout the specification.

Hereinafter, a gearbox for an electric vehicle according to an exemplary embodiment of the present invention is described.

Figure 2:
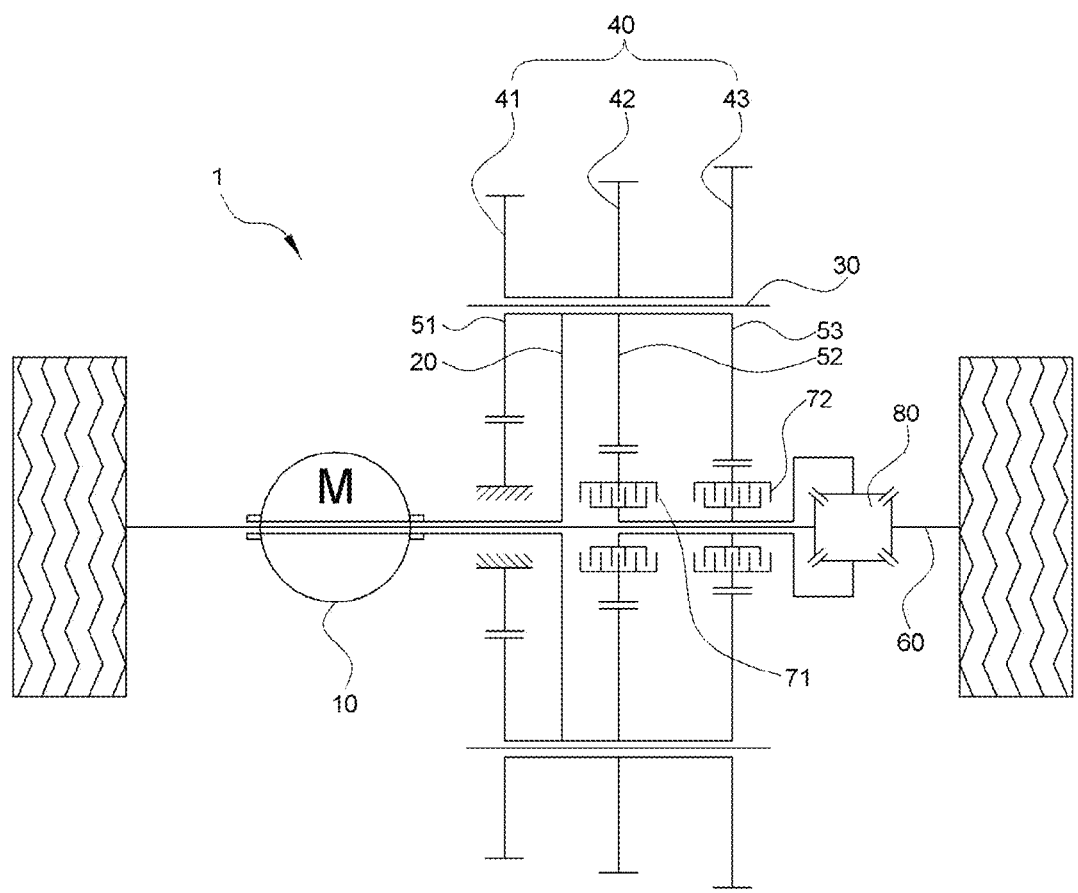
FIG. 2 is a diagram illustrating a gearbox for an electric vehicle according to an exemplary embodiment of the present invention.

FIG. 2 is a diagram illustrating a gearbox for an electric vehicle according to an exemplary embodiment of the present invention.

Referring to FIG. 2, a gearbox 1 for an electric vehicle includes a power source 10, an input shaft 20, a rotating shaft 30, a planetary gear set 40, a first sun gear 51, a second sun gear 52, a third sun gear 53, an output shaft 60, a first clutch 71, a second clutch 72, and a differential gear 80.

First, the power source 10 is described.

The power source 10 is a device capable of generating rotational force by using electrical energy, and may include an existing motor or the like.

Next, the input shaft 20 is described.

One side of the input shaft 20 may be connected to the power source 10 to receive the rotational force from the power source 10.

Next, the rotating shaft 30 is described.

A first planetary gear 41, a second planetary gear 42, and a third planetary gear 43 to be described below may be rotatably installed on the rotating shaft 30.

Next, the planetary gear set 40 is described.

The planetary gear set 40 includes the first planetary gear 41, the second planetary gear 42, and the third planetary gear 43 that, upon receiving the rotational force from the input shaft 20, convert torque of the received rotational force and output the same.

Specifically, when the input shaft 20 rotates, the first planetary gear 41, the second planetary gear 42, and the third planetary gear 43 gear-coupled with the input shaft 20 rotate and revolve, and the rotational force is transferred to the second sun gear 52 and the third sun gear. 53 to be described below by the rotation and revolution of the first planetary gear 41, the second planetary gear 42, and the third planetary gear 43.

Next, the first sun gear 51, the second sun gear 52, and the third sun gear 53 are described.

One side of the first sun gear 51 is connected to the first planetary gear 41 to receive the rotational force applied from the first planetary gear 41 and the other side thereof is fixed.

One side of the second sun gear 52 is connected to the second planetary gear 42 to receive the rotational force from the second planetary gear 42. Also, the other side of the second sun gear 52 is connected to the first clutch 71 to be described below.

One side of the third sun gear 53 is connected to the third planetary gear 43 to receive the rotational force from the third planetary gear 43. Also, the other side of the third sun gear 53 is connected to a second clutch 72 to be described below.

Next, the output shaft 60 is described.

The output shaft 60 may be selectively connected to the first clutch 71 or the second clutch 72 to be described below to output the rotational force.

Next, the first clutch 71 and the second clutch 72 are described.

The first clutch 71 may be connected to the other side of the second sun gear 52, may selectively connect the second sun gear 52 to the output shaft 60, and may be configured to be the same as the clutch of the related art.

The second clutch 72 may be connected to the other side of the third sun gear 53, may selectively connect the third sun gear 53 to the output shaft 60, and may be configured to be the same as the clutch of the related art.

Next, a differential gear 80 is described.

The differential gear 80 may be configured to connect the first clutch 71 and the second clutch 72 to the output shaft 60, and may be configured to be the same as the differential gear of the related art. That is, the first clutch 71 and the second clutch 72 may be connected to the differential gear 80, and the differential gear 80 may be connected to the output shaft 60.

Meanwhile, the first planetary gear 41, the second planetary gear 42, the third planetary gear 43, the first sun gear 51, the second sun gear 52, the third sun gear 53, the first clutch 71, and the second clutch 72 are configured as described above, so that the rotational force of the power source 10 may be transferred to the output shaft 60.

Specifically, when the input shaft 20 rotates, the first planetary gear 41, the second planetary gear 42, and the third planetary gear 43 revolve, and due to the revolution of the first planetary gear 41 and a tooth surface restraint of the first sun gear 51 and the first planetary gear 41, the first planetary gear 41 rotates.

Next, in response to the rotation and revolution speed of the first planetary gear 41, the second planetary gear 42 and the third planetary gear 43 rotate and revolve, and due to a tooth surface restraint of the second sun gear 52 and the second planetary gear 43 and a tooth surface restraint of the third sun gear 53 and the third planetary gear 43, the second sun gear 52 and the third sun gear 53 may receive the rotational force and be reduced and rotated.

At this time, when the first clutch 71 connects the second sun gear 52 to the output shaft 60 and the second clutch 72 releases the connection between the third sun gear 53 and the output shaft 60, the rotational force received from the input shaft 20 through the second planetary gear 42 is transferred to the output shaft 60 (single reduction).

Further, when the second clutch 72 connects the third sun gear 53 to the output shaft 60 and the first clutch 71 releases the connection between the second sun gear 52 and the output shaft 60, the rotational force received from the input shaft 20 through the third planetary gear 43 is transferred to the output shaft 60 (double reduction).

Meanwhile, for the output shaft 60 to receive the rotational force and rotate, a reduction ratio may be set. The reduction ratio of the single reduction or the double reduction of the output shaft 60 may be determined by Equation 1 and Equation 2 below.

$$i_1 = \frac{Z_{S1} \times Z_{P2} - Z_{S2} \times Z_{P1}}{Z_{S2} \times Z_{P1}} \quad \text{[Equation 1]}$$

(Here, $i_1$ is a reduction ratio of the single reduction, $Z_{s1}$ is the number of teeth of the first sun gear 51, $Z_{s2}$ is the number of teeth of the second sun gear 52, $Z_{p1}$ is the number of teeth of the first planetary gear 41, and $Z_{p2}$ is the number of teeth of the second planetary gear 42.)

$$i_2 = \frac{Z_{S1} \times Z_{P2} - Z_{S2} \times Z_{P1}}{Z_{S2} \times Z_{P1}} \quad \text{[Equation 2]}$$

(Here, $i_2$ is a reduction ratio of the double reduction, $Z_{a1}$ is the number of teeth of the first sun gear 51, $Z_{a3}$ is the number of teeth of the third sun gear 53, $Z_{p1}$ is the number of teeth of the first planetary gear 41, and $Z_{p3}$ is the number of teeth of the third planetary gear.)

Hereinafter, a gearbox for an electric vehicle according to another exemplary embodiment of the present invention is described.

Figure 3:
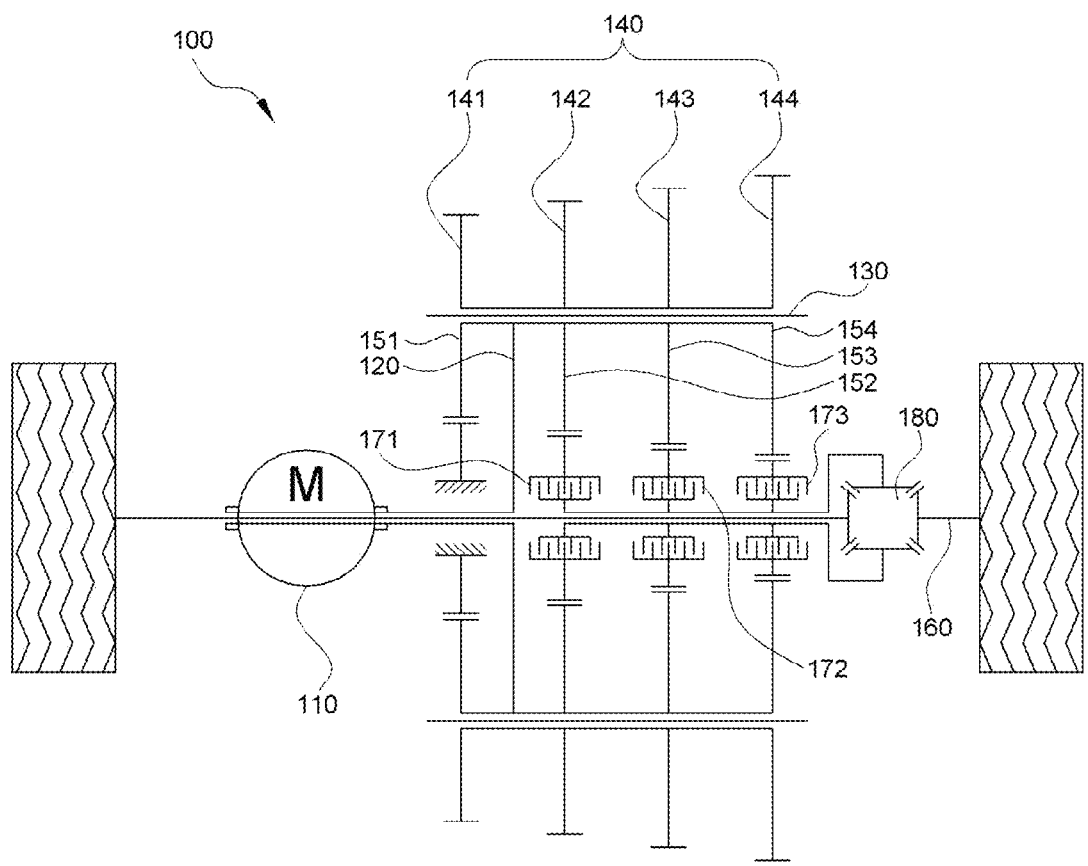
FIG. 3 is a diagram illustrating a gearbox for an electric vehicle according to another exemplary embodiment of the present invention.

FIG. 3 is a diagram illustrating a gearbox for an electric vehicle according to another exemplary embodiment of the present invention.

Referring to FIG. 3, a gearbox 100 for an electric vehicle includes a power source 110, an input shaft 120, a rotating shaft 130, a planetary gear set 140, a first sun gear 151, a second sun gear 152, a third sun gear 153, a fourth sun gear 154, an output shaft 160, a first clutch 171, a second clutch 172, a third clutch 173, and a differential gear 180.

First, the power source 110 is described.

The power source 110 is a device capable of generating rotational force by using electrical energy, and may include an existing motor or the like.

Next, the input shaft 120 is described.

One side of the input shaft 120 may be connected to the power source 110 to receive the rotational force from the power source 110.

Next, the rotating shaft 130 is described.

A first planetary gear 141, a second planetary gear 142, a third planetary gear 143, and a fourth planetary gear 144 to be described below may be rotatably installed on the rotating shaft 130.

Next, the planetary gear set 140 is described.

The planetary gear set 140 includes the first planetary gear 141, the second planetary gear 142, the third planetary gear 143, and the fourth planetary gear 144 that, upon receiving the rotational force from the input shaft 120, convert torque of the received rotational force and output the same.

Specifically, when the input shaft 120 rotates, the first planetary gear 141, the second planetary gear 142, the third planetary gear 143, and the fourth planetary gear 144 gear-coupled with the input shaft 120 rotate and revolve, and the rotational force is transferred to the second sun gear 152, the third sun gear 153, and the fourth sun gear 154 to be described below by the rotation and revolution of the first planetary gear 141, the second planetary gear 142, the third planetary gear 143, and the fourth planetary gear 144.

Next, the first sun gear 151, the second sun gear 152, the third sun gear 153, and the fourth sun gear 154 are described.

One side of the first sun gear 151 is connected to the first planetary gear 141 to receive the rotational force from the first planetary gear 141, and the other side thereof is fixed.

One side of the second sun gear 152 is connected to the second planetary gear 142 to receive the rotational force from the second planetary gear 142. Also, the other side of the second sun gear 152 is connected to the first clutch 171 to be described below.

The third sun gear 153 is connected to the third planetary gear 143 to receive the rotational force from the third planetary gear 143. Also, the other side of the third sun gear 153 is connected to the third clutch 173 to be described below.

One side of the fourth sun gear 154 is connected to the fourth planetary gear 144 to receive the rotational force from the fourth planetary gear 144. Also, the other side of the fourth sun gear 154 is connected to the fourth clutch 174 to be described below.

Next, the output shaft 160 is described.

The output shaft 160 may be selectively connected to the first clutch 171, the second clutch 172, or the third clutch 173 to be described below to output the rotational force.

Next, the first clutch 171, the second clutch 172, and the third clutch 173 are described.

The first clutch 171 may be connected to the other side of the second sun gear 152, may selectively connect the second sun gear 152 to the output shaft 160, and may be configured to be the same as the clutch of the related art.

The second clutch 172 may be connected to the other side of the third sun gear 153, may selectively connect the third sun gear 153 to the output shaft 160, and may be configured to be the same as the clutch of the related art.

The third clutch 173 may be connected to the other side of the fourth sun gear 154, may selectively connect the fourth sun gear 154 to the output shaft 160, and may be configured to be the same as the clutch of the related art.

Next, the differential gear 180 is described.

The differential gear 180 may be configured to connect the first clutch 171, the second clutch 172, and the third clutch 173 to the output shaft 160, and may be configured to be the same as the differential gear of the related art. That is, the first clutch 171, the second clutch 172, and the third clutch 173 may be connected to the differential gear 180, and the differential gear 180 may be connected to the output shaft 160.

Meanwhile, the first planetary gear 141, the second planetary gear 142, the third planetary gear 143, the fourth planetary gear 144, the first sun gear 151, the second sun gear 152, the third sun gear 153, the fourth sun gear 154, the first clutch 171, the second clutch 172, and the third clutch 173 are configured as described above, so that the rotational force of the power source 110 may be transferred to the output shaft 160.

Specifically, when the input shaft 120 rotates, the first planetary gear 141, the second planetary gear 142, the third planetary gear 143, and the fourth planetary gear 144 revolve, due to the revolution of the first planetary gear 41 and a tooth surface restraint of the first sun gear 151 and the first planetary gear 141, the first planetary gear 141 rotates.

Next, in response to the rotation and revolution speed of the first planetary gear 141, the second planetary gear 142, the third planetary gear 143, and the fourth planetary gear 144 rotate and revolve, and due to a tooth surface restraint of the second sun gear 152 and the second planetary gear 142, a tooth surface restraint of the third sun gear 153 and the third planetary gear 143, and a tooth surface restraint of the fourth sun gear 154 and the fourth planetary gear 144, the second sun gear 52, the third sun gear 53, and the fourth sun gear 154 may receive the rotational force and be reduced and rotated.

At this time, when the first clutch 171 connects the second sun gear 152 to the output shaft 160, the second clutch 172 releases the connection between the third sun gear 153 and the output shaft 160, and the third clutch 173 releases the connection between the fourth sun gear 154 and the output shaft 160, the rotational force received from the input shaft 120 is transferred to the output shaft 160 through the second planetary gear 142 (single reduction).

Also, when the second clutch 172 connects the third sun gear 153 to the output shaft 160, the first clutch 171 releases the connection between the second sun gear 152 and the output shaft 160, and the third clutch 173 releases the connection between the fourth sun gear 154 and the output shaft 160, the rotational force received from the input shaft 120 is transferred to the output shaft through the third planetary gear 143 (double reduction).

In addition, when the third clutch 173 connects the fourth sun gear 154 to the output shaft 160, the first clutch 171 releases the second sun gear 152 and the output shaft 160, and the second clutch 172 releases the connection between the third sun gear 153 and the output shaft 160, the rotational force received from the input shaft 120 is transferred to the output shaft 160 through the fourth planetary gear 144 (triple reduction).

According to the solution to the problems of the present invention, the gearbox for an electric vehicle according to the present invention is configured to include a small number of parts, thereby reducing manufacturing costs and being manufactured to be light in weight.

In addition, since the power transmission device is formed of a multi-gear engagement structure including a planetary gear reduction structure, durability of the power transmission device may be improved and may not be easily damaged.

In addition, since the multi-stage reducer including a planetary gear reduction structure is configured, an effect of allowing an electric vehicle to be driven in a driving region with high motor efficiency may be provided.

The foregoing description of the present invention is an illustration, and it may be understood by a person of ordinary skill in the art that the present invention may be easily changed in different detailed forms without changing the technical spirit or an essential characteristic of the present invention. Therefore, it should be understood that the foregoing exemplary embodiments are not limited but are illustrative. For example, each constituent element described in a single type may be distributedly performed, and constituent elements described in a distributed type may be performed in a combined form.

The scope of the present invention is represented by claims to be described below, and it should be analyzed that a meaning and the scope of claims and an entire change or a changed form derived from an equivalent concept thereof are included in the scope of the present invention.

DETAILED DESCRIPTION OF MAIN ELEMENTS 1, 100: gearbox for electric vehicle
10, 110: power source
20, 120: input shaft
30, 130: rotating shaft
40, 140: planetary gear set
60, 160: output shaft
80, 180: differential gear

What is claimed is:

1. A gearbox for an electric vehicle, the gearbox comprising:
   a power source configured to generate rotational force;
   an input shaft having one side connected to the power source and configured to receive the rotational force from the power source;
   a planetary gear set including a first planetary gear, a second planetary gear, and a third planetary gear to convert torque of the rotational force applied from the input shaft and output the converted torque;
   a rotating shaft on which the first planetary gear, the second planetary gear, and the third planetary gear are rotatably installed;
   a first sun gear having one side connected to the first planetary gear to receive the rotational force from the first planetary gear and the other side fixed;
   a second sun gear having one side connected to the second planetary gear to receive the rotational force from the second planetary gear;
   a third sun gear having one side connected to the third planetary gear to receive the rotational force from the third planetary gear;
   an output shaft configured to output the rotational force;
   a first clutch connected to the other side of the second sun gear and configured to selectively connect the second sun gear to the output shaft; and
   a second clutch connected to the other side of the third sun gear and configured to selectively connect the third sun gear to the output shaft.

2. The gearbox of claim 1, wherein when the first clutch connects the second sun gear to the output shaft and the second clutch releases the connection between the third sun gear and the output shaft, the rotational force applied from the input shaft through the second planetary gear is transferred to the output shaft.

3. The gearbox of claim 1, wherein when the second clutch connects the third sun gear to the output shaft and the first clutch releases the connection between the second sun gear and the output shaft, the rotational force applied from the input shaft through the third planetary gear is transferred to the output shaft.

4. The gearbox of claim 1, wherein when the first clutch connects the second sun gear to the output shaft and the second clutch releases the connection between the third sun gear and the output shaft, the rotational force applied from the input shaft through the second planetary gear is transferred to the output shaft, and
   when the second clutch connects the third sun gear to the output shaft and the first clutch releases the connection between the second sun gear and the output shaft, the rotational force applied from the input shaft through the third planetary gear is transferred to the output shaft.

5. The gearbox of claim 1, wherein the first clutch and the second clutch are connected to a differential gear, and the differential gear is connected to the output shaft.

6. The gearbox of claim 1, wherein the power source includes a motor.

7. A gearbox for an electric vehicle, the gearbox comprising:
   a power source configured to generate rotational force;
   an input shaft having one side connected to the power source and configured to receive the rotational force from the power source;
   a planetary gear set including a first planetary gear, a second planetary gear, a third planetary gear, and a fourth planetary to convert torque of the rotational force applied from the input shaft and output the converted torque;
   a rotating shaft on which the first planetary gear, the second planetary gear, the third planetary gear, and the fourth planetary gear are rotatably installed;
   a first sun gear having one side connected to the first planetary gear to receive the rotational force from the first planetary gear and the other side fixed;
   a second sun gear having one side connected to the second planetary gear to receive the rotational force from the second planetary gear;
   a third sun gear having one side connected to the third planetary gear to receive the rotational force from the third planetary gear;
   a fourth sun gear having one side connected to the fourth planetary gear to receive the rotational force from the fourth planetary gear;
   an output shaft configured to output the rotational force;
   a first clutch connected to the other side of the second sun gear and configured to selectively connect the second sun gear to the output shaft;
   a second clutch connected to the other side of the third sun gear and configured to selectively connect the third sun gear to the output shaft; and
   a third clutch connected to the other side of the fourth sun gear and configured to selectively connect the fourth sun gear to the output shaft.

8. The gearbox of claim 7, wherein when the first clutch connects the second sun gear to the output shaft, the second clutch releases the connection between the third sun gear and the output shaft, and the third clutch releases the connection between the fourth sun gear and the output shaft, the rotational force applied from the input shaft through the second planetary gear is transferred to the output shaft.

9. The gearbox of claim 7, wherein when the second clutch connects the third sun gear to the output shaft, the first clutch releases the connection between the second sun gear and the output shaft, and the third clutch releases the connection between the fourth sun gear and the output shaft, the rotational force applied from the input shaft through the third planetary gear is transferred to the output shaft.

10. The gearbox of claim 7, wherein when the third clutch connects the fourth sun gear to the output shaft, the first clutch releases the connection between the second sun gear and the output shaft, and the second clutch releases the connection between the third sun gear and the output shaft, the rotational force applied from the input shaft through the fourth planetary gear is transferred to the output shaft.

11. The gearbox of claim 7, wherein when the first clutch connects the second sun gear to the output shaft, the second clutch releases the connection between the third sun gear and the output shaft, and the third clutch releases the connection between the fourth sun gear and the output shaft, the rotational force applied from the input shaft through the second planetary gear is transferred to the output shaft,
    when the second clutch connects the third sun gear to the output shaft, the first clutch releases the connection between the second sun gear and the output shaft, and the third clutch releases the connection between the fourth sun gear and the output shaft, the rotational force applied from the input shaft through the third planetary gear is transferred to the output shaft, and
    when the third clutch connects the fourth sun gear to the output shaft, the first clutch releases the connection between the second sun gear and the output shaft, and the second clutch releases the connection between the third sun gear and the output shaft, the rotational force applied from the input shaft through the fourth planetary gear is transferred to the output shaft.

12. The gearbox of claim 7, wherein the first clutch, the second clutch, and the third clutch are connected to a differential gear, and the differential gear is connected to the output shaft.

13. The gearbox of claim 7, wherein the power source includes a motor.

\* \* \* \* \*